United States Patent
Miyoshi

(10) Patent No.: US 10,324,510 B2
(45) Date of Patent: Jun. 18, 2019

(54) INFORMATION PROCESSING APPARATUS AND METHOD FOR MEASURING ENERGY CONSUMPTION

(71) Applicant: FUJITSU LIMITED, Kawasaki-shi, Kanagawa (JP)

(72) Inventor: Ikuo Miyoshi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 343 days.

(21) Appl. No.: 15/091,605

(22) Filed: Apr. 6, 2016

(65) Prior Publication Data
US 2016/0305993 A1 Oct. 20, 2016

(30) Foreign Application Priority Data

Apr. 16, 2015 (JP) .................... 2015-084113

(51) Int. Cl.
*G06F 1/28* (2006.01)
*G06F 11/30* (2006.01)

(52) U.S. Cl.
CPC ........... *G06F 1/28* (2013.01); *G06F 11/3062* (2013.01)

(58) Field of Classification Search
CPC ....... G01R 22/10; G06F 1/28; G06F 11/3062; G06F 1/3225; G06F 1/3275; Y02D 10/14; G01D 4/00; G06N 7/005; Y02B 90/245; Y04S 20/40
USPC .................... 711/154, 105, 118, 156; 706/52
See application file for complete search history.

(56) References Cited

U.S. PATENT DOCUMENTS

| | | |
|---|---|---|
| 2008/0209403 A1 | 8/2008 | Kimura |
| 2013/0132048 A1 | 5/2013 | Yamamoto |
| 2013/0232354 A1 | 9/2013 | Ono |
| 2014/0172772 A1* | 6/2014 | Sanchez Loureda .... G01D 4/00 706/52 |

FOREIGN PATENT DOCUMENTS

| | | |
|---|---|---|
| JP | 10-322905 A | 12/1998 |
| JP | 11-261670 A | 9/1999 |
| JP | 2008-210011 | 9/2008 |
| JP | 2013-109442 A | 6/2013 |
| JP | 2013-182558 A | 9/2013 |

OTHER PUBLICATIONS

Japanese Office Action dated Nov. 6, 2018 for corresponding Japanese Patent Application No. 2015-084113, with English Translation, 9 pages.

\* cited by examiner

*Primary Examiner* — Mouloucoulaye Inoussa
(74) *Attorney, Agent, or Firm* — Fujitsu Patent Center

(57) ABSTRACT

A storage unit stores therein first information indicating the correspondence among each acquisition time point at which a result of measuring cumulative energy consumed during the execution of a program was acquired, the cumulative energy, and the memory address of an instruction executed at the acquisition time point. The storage unit stores therein second information indicating the correspondence between each executed part of the program and a range of the memory addresses of instructions of the program. A computation unit determines time points in the execution of a predetermined executed part, on the basis of the first and second information, and calculates cumulative energy for each of the time points with linear interpolation.

9 Claims, 18 Drawing Sheets

| INSTRUCTION ADDRESS CONVERSION TABLE | | |
|---|---|---|
| EXECUTED PART | START ADDRESS | END ADDRESS |
| x_solve | 0x409d20 | 0x40e00b |
| y_solve | 0x40e010 | 0x41280f |
| z_solve | 0x412810 | 0x417240 |
| ... | ... | ... |

FIG. 5

| ENERGY MEASUREMENT TABLE ||| 112 |
|---|---|---|
| TIME | INSTRUCTION ADDRESS | CUMULATIVE ENERGY |
| ... | ... | ... |
| T1 | 0x5156431 | 864654541 |
| T2 | 0x7f9d4a2bf627 | 1982315963 |
| T3 | 0x422427 | 1982315963 |
| T4 | 0x41f340 | 3152191162 |
| ... | ... | ... |

FIG. 6

| CORRECTED RESULT TABLE | | | 113 |
|---|---|---|---|
| TIME | INSTRUCTION ADDRESS | CUMULATIVE ENERGY | |
| ... | ... | ... | |
| T1 | 0x5156431 | 864654541 | |
| T2 | 0x7f9d4a2bf627 | 1287391184 | |
| T3 | 0x422427 | 1872085321 | |
| T4 | 0x41f340 | 3152191162 | |
| ... | ... | ... | |

| ENERGY ANALYSIS TABLE ||||| 
|---|---|---|---|---|
| EXECUTED PART | MEASUREMENT COUNT | ENERGY CONSUMPTION | MAXIMUM ENERGY CONSUMPTION | AVERAGE ENERGY CONSUMPTION |
| x_solve | 3291 | 386855 | 134.9 | 117.5 |
| y_solve | 3613 | 417352 | 133.3 | 115.5 |
| z_solve | 3908 | 449041 | 132.5 | 114.9 |
| ... | ... | ... | ... | ... |

FIG. 8

INFORMATION PROCESSING APPARATUS AND METHOD FOR MEASURING ENERGY CONSUMPTION

CROSS-REFERENCE TO RELATED APPLICATION

This application is based upon and claims the benefit of priority of the prior Japanese Patent Application No. 2015-084113, filed on Apr. 16, 2015, the entire contents of which are incorporated herein by reference.

FIELD

The embodiments discussed herein relate to an information processing apparatus and a method for measuring energy consumption.

BACKGROUND

A variety of software programs have been available for computers. In some cases, the operation of a computer running a software program may be verified, and then the software program may be modified and tuned for energy saving and performance improvement. As a method for the operation verification, there has been proposed a method of identifying an instruction being executed from the program counter of a Central Processing Unit (CPU) at fixed cycles during the execution of a target program for which information is collected, finding memory addresses accessed for reading or storing data, and obtaining the access frequency for each memory address.

Please see, for example, Japanese Laid-open Patent Publication No. 2008-210011.

Energy consumption of a computer running a program may be measured with a measurement device that measures energy consumption. Energy consumption for each executed part (for example, a subroutine or an operating range of a source program) of a program may be analyzed by sampling a memory address at which an instruction being executed is stored and cumulative energy consumption measured by the measurement device at predetermined intervals. For example, there is room for an improvement in the code description corresponding to executed parts with relatively high energy consumption.

However, the intervals for updating measurement data by the measurement device may be longer than the intervals at which the program to be verified changes its behavior. For example, at a certain time, the memory address of an instruction being executed on a computer is obtained, and measurement data obtained by the measurement device is referenced. Then, at the next time, the memory address of an instruction being executed is obtained, but the measurement data to be referenced may not have been updated by the measurement device. In this case, the energy consumption between these times is observed to be zero. That is to say, incorrect energy consumption may be obtained for some executed parts.

SUMMARY

According to one aspect, there is provided an information processing apparatus including: a memory that stores therein first information and second information, the first information indicating a correspondence among each acquisition time point at which a result of measuring cumulative energy consumed during an execution of a program was acquired, the cumulative energy, and a memory address of an instruction executed at the acquisition time point, the second information indicating a correspondence between each executed part of the program and a range of memory addresses of instructions; and a processor that performs a process including determining time points in an execution of a predetermined executed part of the program, based on the first information and the second information, and calculating cumulative energy for each of the time points with linear interpolation.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of an instruction address conversion table;

FIG. 6 illustrates an example of an energy measurement table;

FIG. 7 illustrates an example of a corrected result table;

FIG. 8 illustrates an example of an energy analysis table;

DESCRIPTION OF EMBODIMENTS

Figure 1:
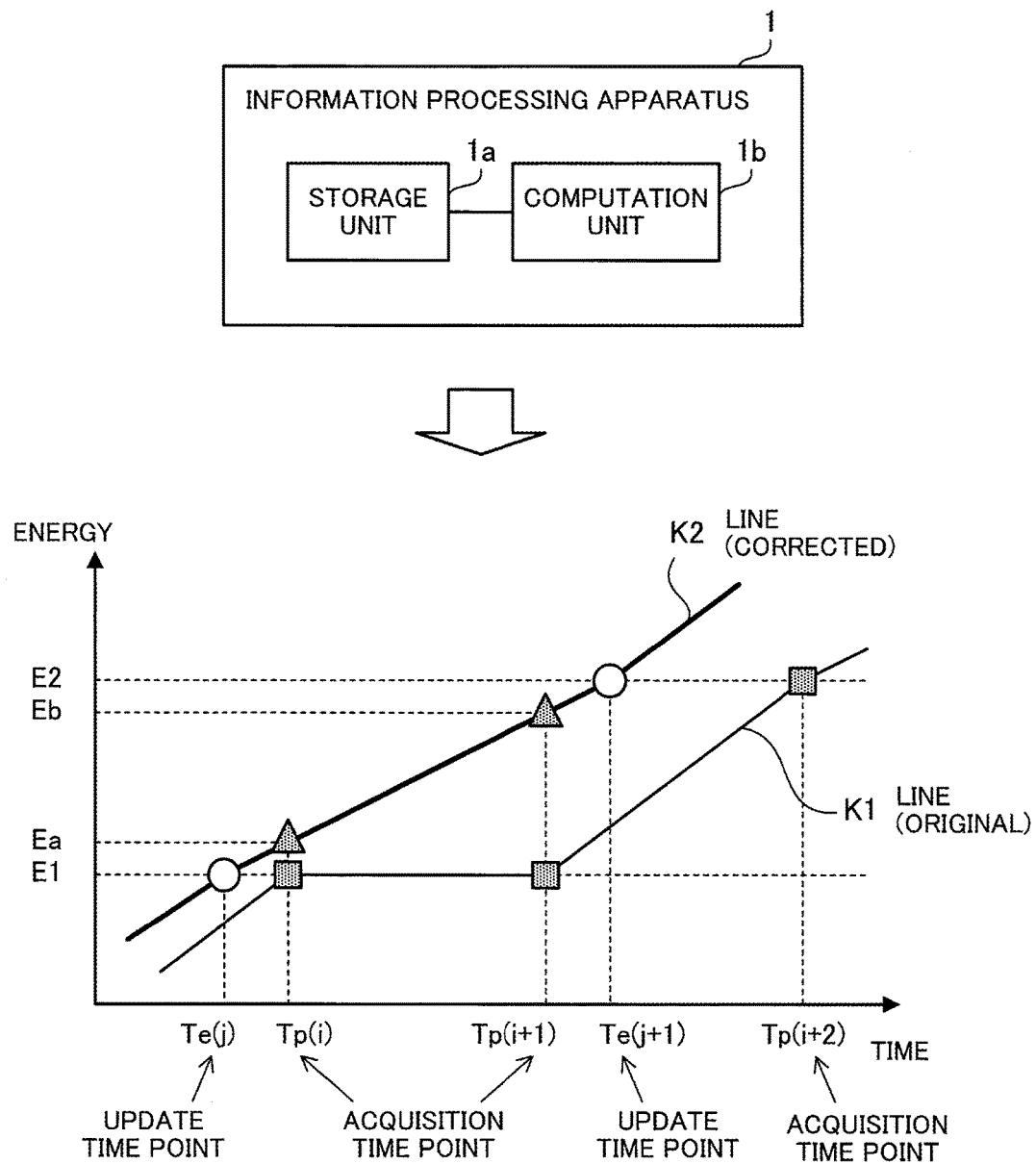
FIG. 1 illustrates an information processing apparatus according to a first embodiment.

Several embodiments will be described below with reference to the accompanying drawings, wherein like reference numerals refer to like elements throughout.

(First Embodiment)

FIG. 1 illustrates an information processing apparatus according to a first embodiment. An information processing apparatus 1 is used to verify the operations of programs. The information processing apparatus 1 runs a program to be verified, and obtains energy consumption for each executed part (a subroutine or a range of prescribed rows of the program) of the program. The information processing apparatus 1 displays information about the energy consumption for each executed part on a display connected thereto, to present it to a user. By confirming this, the user is able to improve the coding of executed parts with relatively high energy consumption, for example.

The information processing apparatus 1 is able to obtain cumulative energy consumption (cumulative energy) of the information processing apparatus 1 running the program, from a measurement device (not illustrated) provided external to or within the information processing apparatus 1. The information processing apparatus 1 acquires a measurement result obtained by the measurement device at predetermined intervals, and obtains energy consumption for a time period from the previous acquisition to the current acquisition.

If the intervals for updating measurement data by the measurement device are longer than the intervals at which the program to be verified changes its behavior, the energy consumption between the previous acquisition and the current acquisition may be observed to be zero, thereby failing to obtain the energy consumption correctly. To deal with this, the information processing apparatus 1 is designed to obtain energy consumption in the following manner.

The information processing apparatus 1 includes a storage unit 1a and a computation unit 1b. The storage unit 1a may be a Random Access Memory (RAM) or another volatile storage device. Alternatively, the storage unit 1a may be a Hard Disk Drive (HDD), a flash memory, or another non-volatile storage device. The computation unit 1b may include a CPU, a Digital Signal Processor (DSP), an Application Specific Integrated Circuit (ASIC), a Field Programmable Gate Array (FPGA), or others. The computation unit 1b may be a processor that runs programs. The "processor" here includes a set of a plurality of processors (multiprocessor).

The storage unit 1a stores first information indicating the correspondence among each time point at which a result of measuring cumulative energy consumed during the execution of the program to be verified was acquired, the cumulative energy, and the memory address of an instruction executed at the time point in the information processing apparatus. The computation unit 1b may obtain such first information while the program to be verified runs, and then store the first information in the storage unit 1a. The storage unit 1a also stores second information indicating the correspondence between each executed part of the program to be verified and a range of instruction memory addresses.

The computation unit 1b determines time points in the execution of a predetermined executed part, on the basis of the first and second information stored in the storage unit 1a. For example, the second information includes the correspondence between each executed part of the program and a range of memory addresses at which instructions of a computing process performed in the executed part are stored. Therefore, the computation unit 1b is able to determine when and which executed part was executed, on the basis of a history of addresses indicated in the first information.

The computation unit 1b calculates cumulative energy of the information processing apparatus 1 for the time points in the execution of the predetermined executed part with linear interpolation. In the following description, "i" is an integer and indicates the i-th sampling of the memory address of an instruction of a computing process performed during the execution of the program, and "j" is an integer and indicates the j-th update of a result of measuring cumulative energy. An acquisition time point (sampling time point) $Tp(i)$ refers to the time point of the i-th sampling regarding a memory address at which an instruction of a computing process performed during the execution of the program is stored. An update time point $Te(j)$ refers to the time point of the j-th update of a result of measuring cumulative energy.

For example, the first information includes the following records. A first record includes an acquisition time point of $Tp(i)$, cumulative energy of E1, and an address of X1. A second record includes an acquisition time point of $Tp(i+1)$, cumulative energy of E1, and an address of X2. A third record includes an acquisition time point of $Tp(i+2)$, cumulative energy of E2, and an address of X3. In this case, with respect to the acquisition time points $Tp(i)$ and $Tp(i+1)$, the same cumulative energy E1 is obtained although a result of measuring an amount of energy was acquired at different time points during the execution of the program. That is, a difference in the cumulative energy between the acquisition time points $Tp(i)$ and $Tp(i+1)$ is observed to be zero, and thus energy consumption for the time period between the acquisition time points $Tp(i)$ and $Tp(i+1)$ is observed to be zero by error.

Therefore, the computation unit 1b calculates cumulative energy for the acquisition time point $Tp(i+1)$ (a time point of when the executed part corresponding to the address X2 was executed) with linear interpolation. One method is considered, in which the computation unit 1b obtains a linear equation that represents such a relationship between time and cumulative energy as to connect the cumulative energy E1 of the acquisition time point $Tp(i)$ and the cumulative energy E2 of the acquisition time point $Tp(i+2)$, and then calculates the cumulative energy for the acquisition time point $Tp(i+1)$ with the obtained linear equation.

By the way, that erroneous measurement occurs when the intervals Ie at which the measurement device updates a result of measuring cumulative energy are longer than the sampling intervals Ip for sampling the address of an instruction executed in the program (Ie>Ip). That is, at the acquisition time point $Tp(i)$, cumulative energy updated by the measurement device at the update time point $Te(j)$ is obtained. At the acquisition time point $Tp(i+1)$, the measurement result has not been updated because the sampling is performed before the next update time point $Te(j+1)$, and therefore the same cumulative energy E1 as obtained at the acquisition time point $Tp(i)$ is obtained again. To deal with this, the computation unit 1b uses linear interpolation to calculate cumulative energy with good accuracy, in the following manner.

The acquisition time point $Tp(i)$ of the address of an instruction executed in the program is expressed as the following equation (1). "Tp0" refers to a reference time point at which the sampling began.

$$Tp(i)=Tp0+Ip\times i \qquad (1)$$

The update time point $Te(j)$ of a result of measuring cumulative energy is expressed as the following equation (2). "Te0" refers to a reference time point at which the update of the measurement result began.

$$Te(j)=Te0+Ie\times j \qquad (2)$$

The sampling of the address of an instruction executed and the update of a measurement result begin almost at the same time. Considering a slight delay due to the update of measurement data by the measurement device, a relationship of $Tp0 \leq Te0 < Tp0+Ip$ holds. Taking a difference between the sampling reference time point Tp0 and the measurement result update reference time point Te0 as De, the following equation (3) holds, where $0 \leq De < Ip$.

$$Te0=Tp0+De \qquad (3)$$

In the case where it is recognized from measurement results that the same energy is obtained twice in a row, the following relational expression (4) holds.

$$Te(j) \leq Tp(i) < Tp(i+1) < Te(j+1) \qquad (4)$$

The update time point Te(j), the acquisition time point Tp(i+1), and the update time point Te(j+1) are expressed as the following equations (5), (6), and (7), respectively.

$$Te(j) = Tp0 + De + Ie \times j \qquad (5)$$

$$Tp(i+1) = Tp0 + Ip \times (i+1) \qquad (6)$$

$$Te(j+1) = Tp0 + De + Ie \times (j+1) \qquad (7)$$

By deforming the expression (4) using the equations (5), (6), and (7), the following expression (8) is obtained.

$$Ip \times (i+1) - Ie \times (j+1) < De \leq Ip \times i - Ie \times j \qquad (8)$$

When measurement is performed for a sufficiently long time period, a plurality of combinations $(i_k, j_k)$ of i and j are obtained to determine the upper and lower limits of the difference De. "k" is an integer and identifies a combination of i and j. In addition, in the case where Ip<Ie and Ip≈Ie are satisfied, it is possible to calculate the difference De using the following equation (9) with relatively high accuracy.

$$De = \frac{\max(Ip \times (i_k+1) - Ie \times (j_k+1)) + \min(Ip \times i_k - Ie \times j_k)}{2} \qquad (9)$$

The max operation is to obtain the maximum value among a plurality of values obtained for "k". The min operation is to obtain the minimum value among a plurality of values obtained for "k". That is, the equation (9) is to calculate the difference De using such "k" that produces the maximum value in the first term of the right side and the minimum value in the second term of the right side. The computation unit 1b calculates the difference De with the equation (9).

The computation unit 1b is able to obtain a ratio of {Tp(i)−Te(j)} to {Te(j+1)−Tp(i)} using the difference De. The expression "Tp(i)−Te(j)" is to obtain a time difference between the time points. The same applies to the expression "Te(j+1)−Tp(i)" and other similar expressions. The result of measuring cumulative energy at the update time point Te(j+1) is equal to the cumulative energy E2 obtained at the acquisition time point Tp(i+2). Therefore, the computation unit 1b calculates each of the cumulative energy Ea for the acquisition time point Tp(i) and the cumulative energy Eb for the acquisition time point Tp(i+1) by internally dividing the difference between the cumulative energy E1 of the update time point Te(j) and the cumulative energy E2 of the update time point Te(j+1) at a ratio obtained as above.

The computation unit 1b may obtain a linear equation passing the two points {time, cumulative energy}={Te(j), E1} and {Te(j+1), E2}. Then, the computation unit 1b calculates the cumulative energy for the acquisition time points Tp(i) and Tp(i+1) using the obtained linear equation. For example, the computation unit 1b calculates the cumulative energy Ea of the time point Tp(i) and the cumulative energy Eb of the time point Tp(i+1).

In this way, the information processing apparatus 1 is able to obtain cumulative energy Eb for the acquisition time point Tp(i+1) correctly. In addition, the information processing apparatus 1 is able to correct the cumulative energy E1 of the acquisition time point Tp(i), so as to obtain the cumulative energy Ea correctly. Furthermore, the information processing apparatus 1 is able to correct the measurement results of all acquisition time points Tp(i) with the above method. For example, it is possible to correct the cumulative energy E2 obtained at the acquisition time point Tp(i+2), using the cumulative energy E2 of the update time point Te(j+1) and the cumulative energy of the update time point Te(j+2), in the same way. As a result of the correction, the information processing apparatus 1 obtains the corrected line K2 from the original line K1 indicating the relationship between time and cumulative energy. The information processing apparatus 1 is able to correctly obtain energy consumption for each executed part of the program to be verified, on the basis of the correspondence between the memory address (indicating an executed part of the program) of an instruction executed at each time point and cumulative energy.

The first embodiment describes an example of using the measurement device to measure cumulative energy. Alternatively, a module having the above-described function may be provided in the information processing apparatus 1 so as to measure cumulative energy therein. In this case, it is also possible to obtain energy consumption correctly for each executed part of a program with the method described in the first embodiment.

(Second Embodiment)

Figure 2:
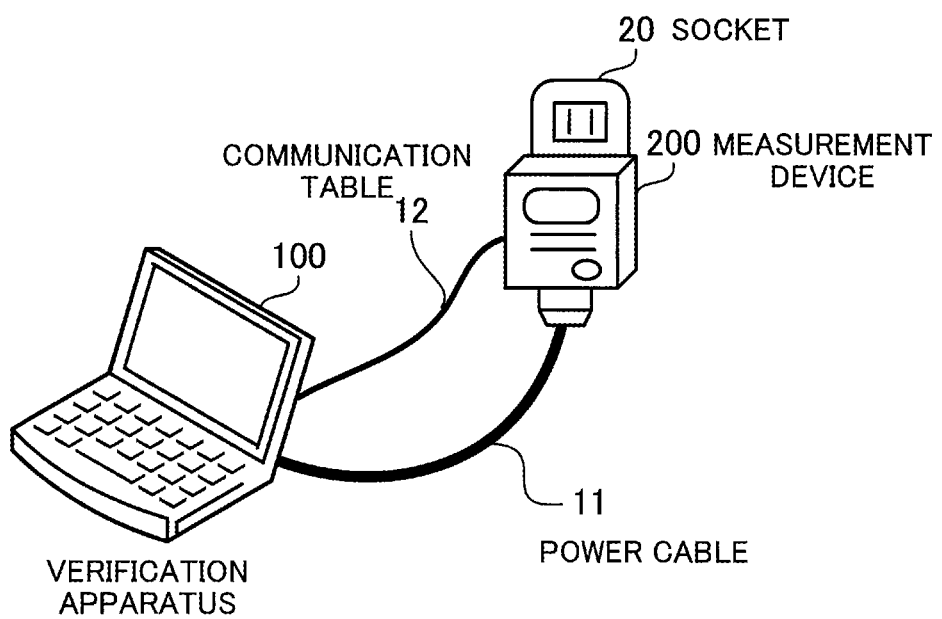
FIG. 2 illustrates an example of a verification apparatus according to a second embodiment.

FIG. 2 illustrates an example of a verification apparatus according to a second embodiment. A verification apparatus 100 is a computer that verifies the operations of application programs. In the following, an application program to be verified may be referred to as a verification target program.

The verification apparatus 100 includes a power cable 11. The verification apparatus 100 is connected to a measurement device 200 with the power cable 11. The measurement device 200 is designed to measure cumulative energy consumed by the verification apparatus 100. The measurement device 200 includes a power plug, which is inserted into a socket 20. The socket 20 accepts the plug to supply power to an electronic device. The measurement device 200 supplies power supplied from the socket 20, to the verification apparatus 100, and measures the amount of energy consumed by the verification apparatus 100. The verification apparatus 100 and measurement device 200 are connected to each other via a communication cable 12.

The verification apparatus 100 obtains energy consumption for each executed part (for example, a subroutine or the operating range of a source program) of the verification target program while running the verification target program. Data on the energy consumption is used for improving energy saving in the execution of the verification target program.

The verification apparatus 100 performs verification as follows. The verification apparatus 100 obtains the memory address of an instruction being executed, at prescribed sampling intervals (intervals at which sampling is performed) while running the verification target program. The verification apparatus 100 acquires a result of measuring energy consumption, obtained by the measurement device 200, at the time of sampling. The amount of energy measured by the measurement device 200 is cumulative energy consumed by the verification apparatus 100. The verification apparatus 100 previously obtains information indicating the correspondence between each executed part of the verification target program and memory addresses at which the instructions described in the executed part are stored, at the time of compiling the verification target program or at another event. The verification apparatus 100 detects an executed part being executed and acquires the cumulative energy, at each sampling time point on the basis of the correspondence and the sampling result during the execution of the verification target program. The verification apparatus 100 is an example of the information processing apparatus 1 of the first embodiment.

Figure 3:
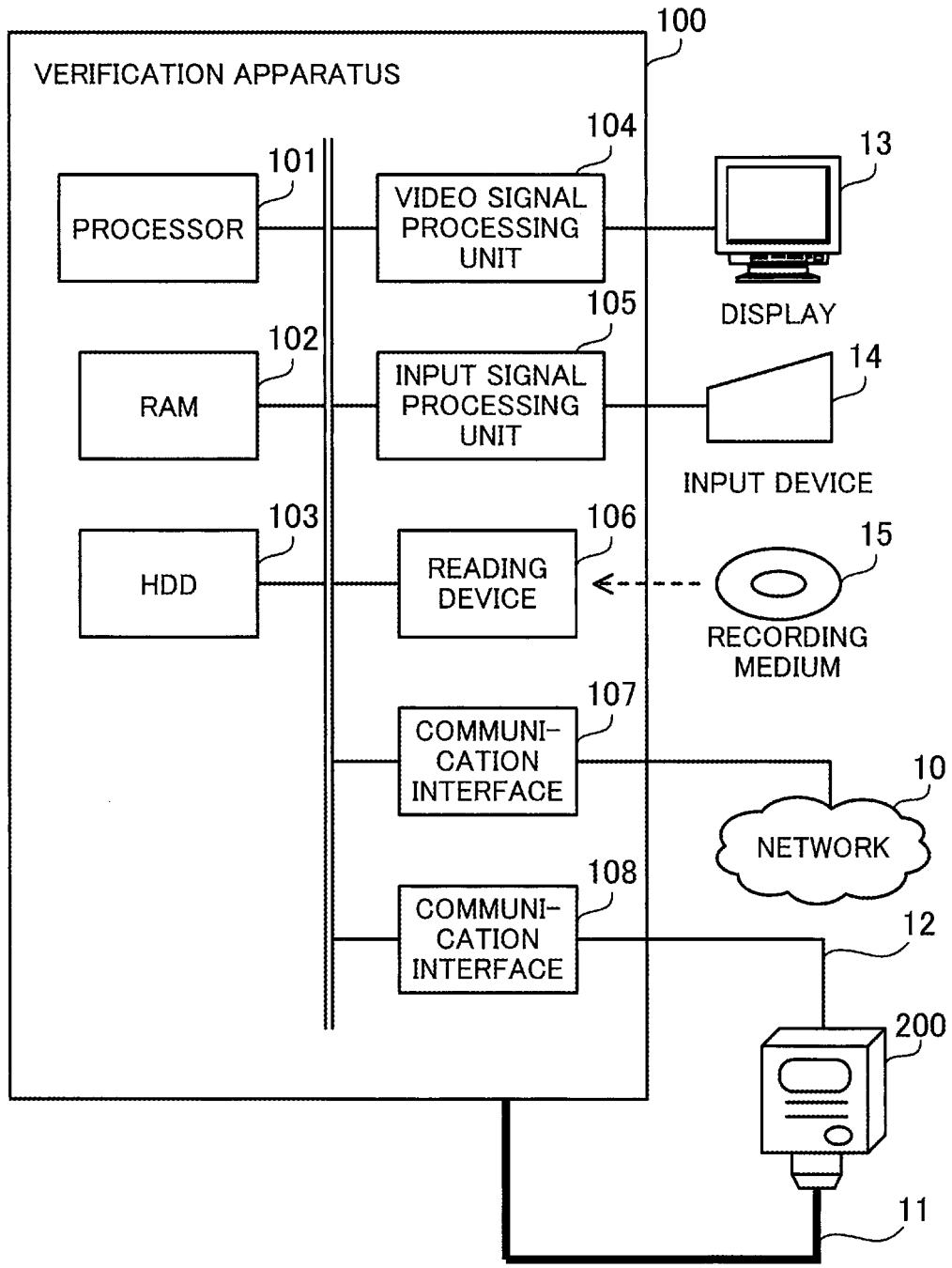
FIG. 3 illustrates an example of a hardware configuration of the verification apparatus.

FIG. 3 illustrates an example of a hardware configuration of a verification apparatus. The verification apparatus 100 includes a processor 101, a RAM 102, an HDD 103, a video signal processing unit 104, an input signal processing unit 105, a reading device 106, and communication interfaces 107 and 108. These units are connected to a bus within the verification apparatus 100.

The processor 101 controls the information processing of the verification apparatus 100. The processor 101 may be a multiprocessor. The processor 101 may be, for example, a CPU, a DSP, an ASIC, an FPGA, or another. The processor 101 may be a combination of two or more units selected from a CPU, a DSP, an ASIC, an FPGA, and others. The processor 101 includes a program counter that is a register holding an address at which an instruction being executed is stored in the RAM 102.

The RAM 102 is a main storage device of the verification apparatus 100. The RAM 102 temporarily stores at least part of Operating System (OS) programs and application programs to be run by the processor 101 and a variety of data that is used while the processor 101 operates.

The HDD 103 is an auxiliary storage device of the verification apparatus 100. The HDD 103 magnetically writes and reads data on a built-in magnetic disk. The HDD 103 stores the OS programs, application programs, and a variety of data. The verification apparatus 100 may be provided with another kind of auxiliary storage device, such as a flash memory or Solid State Drive (SSD), or a plurality of auxiliary storage devices.

The video signal processing unit 104 outputs images to a display 13 connected to the verification apparatus 100 in accordance with instructions from the processor 101. As the display 13, a Cathode Ray Tube (CRT) display, a Liquid Crystal Display, or anther may be used.

The input signal processing unit 105 receives input signals from an input device 14 connected to the verification apparatus 100, and outputs the input signals to the processor 101. As the input device 14, a pointing device, such as a mouse or touch panel, a keyboard, or another may be used.

The reading device 106 reads programs and data from a recording medium 15. For example, as the recording medium 15, a magnetic disk, such as a Flexible Disk (FD) or an HDD, an optical disc, such as a Compact Disc (CD) or a Digital Versatile Disc (DVD), or a Magneto-Optical disk (MO) may be used. In addition, as the recording medium 15, a flash memory card or another non-volatile semiconductor memory may be used. The reading device 106 stores programs and data read from the recording medium 15 in the RAM 102 or HDD 103, in accordance with instructions from the processor 101, for example.

The communication interface 107 communicates with other apparatuses over a network 10. The communication interface 107 may be a wired communication interface or a wireless communication interface. The communication interface 108 communicates with the measurement device 200 via the communication cable 12.

In this connection, the verification apparatus 100 is connected to the measurement device 200 via the power cable 11, as described earlier. The power cable 11 is connected to a power supply (not illustrated) of the verification apparatus 100. The power supply uses power supplied via the power cable 11 to drive each unit of the verification apparatus 100.

In addition, the measurement device 200 includes a processor, a storage device, such as a RAM or flash memory, and a communication interface.

Figure 4:
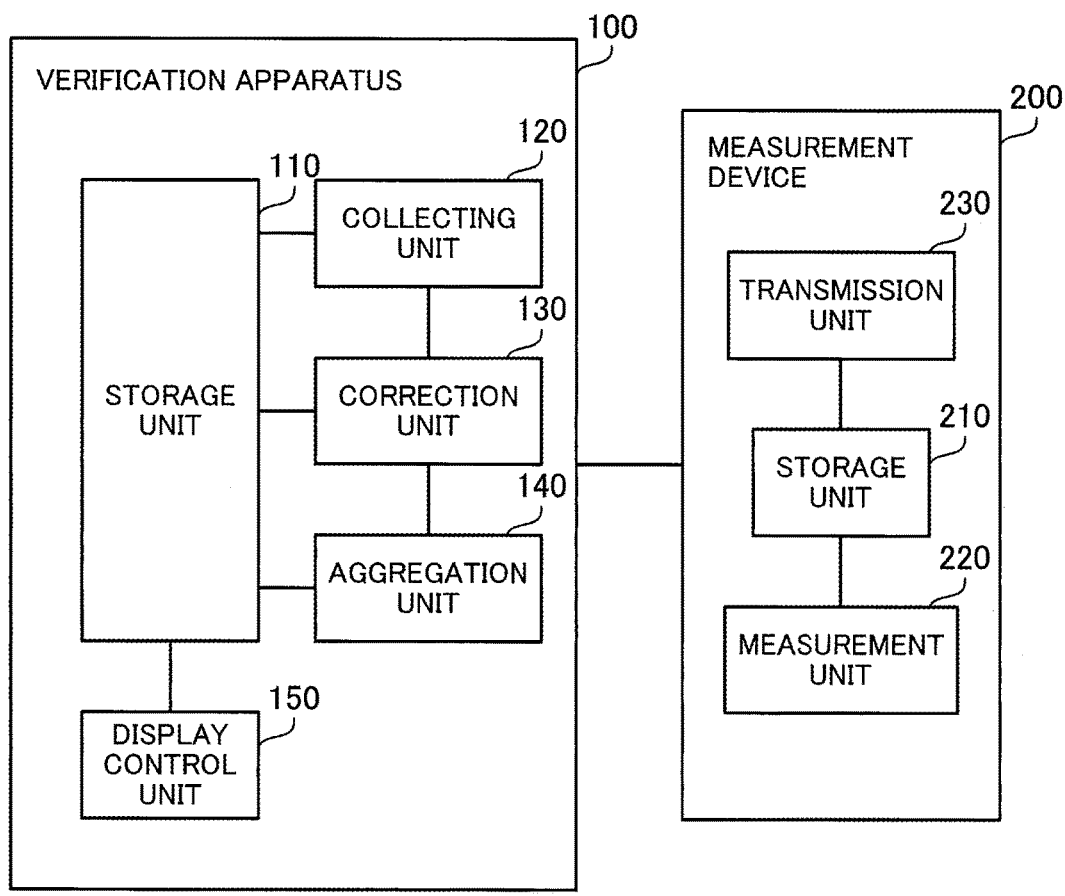
FIG. 4 illustrates exemplary functions of the verification apparatus.

FIG. 4 illustrates exemplary functions of the verification apparatus. The verification apparatus 100 includes a storage unit 110, a collecting unit 120, a correction unit 130, an aggregation unit 140, and a display control unit 150. The storage unit 110 is implemented by using a storage space saved in the RAM 102 or HDD 103. The collecting unit 120, correction unit 130, aggregation unit 140, and display control unit 150 are implemented by the processor 101 running a program stored in the RAM 102.

The storage unit 110 stores therein an instruction address conversion table, an energy measurement table, a corrected result table, and an energy analysis table. The instruction address conversion table contains information indicating the correspondence between each executed part of a verification target program and a range of the addresses of instructions corresponding to the executed part in the RAM 102. The instruction address conversion table is created in advance on the basis of debugger information that is generated by a compiler at the time of compiling the verification target program, and is stored in the storage unit 110.

The energy measurement table contains information of results of sampling an instruction address accessed by the verification target program and cumulative energy. The corrected result table contains information of results of correcting values registered in the energy measurement table. The energy analysis table contains information obtained by aggregating the energy consumption for each executed part with reference to the corrected result table. The storage unit 110 also stores therein the verification target program.

The collecting unit 120 samples an address value of the program counter of the processor 101 and measurement data (cumulative energy) obtained by the measurement device 200 while the verification target program runs. The collecting unit 120 then records the address value and measurement data in association with the sampling time point (at which these were sampled) in the energy measurement table stored in the storage unit 110. The sampling intervals Ip used by the collecting unit 120 are of several milliseconds (five to ten milliseconds), for example.

The correction unit 130 corrects the values of the cumulative energy recorded in the energy measurement table, and creates the corrected result table. The correction unit 130 corrects erroneously detected cumulative energy, which is obtained due to a difference between the sampling intervals Ip for sampling an address and the update intervals Ie for updating measurement data by the measurement device 200, and creates the corrected result table.

The aggregation unit 140 aggregates cumulative energy for each executed part with reference to the corrected result table, and creates the energy analysis table. The aggregation unit 140 obtains the maximum value, average value, and others of the energy consumption for each executed part, and registers them in the energy analysis table.

The display control unit 150 outputs the result of obtaining the energy consumption for each executed part of the verification target program, on the basis of the instruction address conversion table, corrected result table, and energy analysis table to the display 13. For example, the display control unit 150 displays a three-dimensional graph representing the correspondence among time, an executed part, and energy consumption on the display 13. By confirming the three-dimensional graph, a user (for example, a program developer) is able to recognize the energy consumption for each executed part, and to easily detect which parts to modify in the program. For example, the user is able to determine to re-consider the coding of executed parts with relatively high energy consumption.

The measurement device 200 includes a storage unit 210, a measurement unit 220, and a transmission unit 230. The storage unit 210 is implemented by using a storage space saved in a RAM or flash memory of the measurement device 200. The measurement unit 220 and transmission unit 230 are implemented by a processor of the measurement device 200 running a program stored in a storage device of the measurement device 200. In this connection, the measurement unit 220 and transmission unit 230 may be implemented by using an ASIC, an FPGA, or other application-specific electronic circuits.

The storage unit 210 stores therein results (measurement data) of measuring cumulative energy of the verification apparatus 200, obtained by the measurement unit 220.

The measurement unit 220 measures cumulative energy consumed by the verification apparatus 100, and updates the measurement data stored in the storage unit 210. The measurement unit 220 updates the measurement data at predetermined intervals. The update intervals Ie for updating the measurement data by the measurement unit 220 are longer than and nearly equal to the sampling intervals Ip used by the verification apparatus 100 (i.e., Ie>Ip and Ie≈Ip).

The transmission unit 230 sends measurement data stored in the storage unit 210 to the verification apparatus 100 in response to a request from the verification apparatus 100.

FIG. 5 illustrates an example of an instruction address conversion table. The instruction address conversion table 111 is stored in the storage unit 110. The instruction address conversion table 111 has the following fields: Executed Part, Start Address, and End Address.

The Executed Part field contains the name of an executed part (the name of a subroutine, the range of row numbers of a loop, the row numbers or function name of a source program, or the like). The Start Address field contains the start address of the range of addresses at which the instructions corresponding to the executed part are stored. The End Address field contains the end address of the range of addresses at which the instructions corresponding to the executed part are stored.

For example, the instruction address conversion table 111 has a record with "x_solve" in the Executed Part field, "0x409d20" in the Start Address field, and "0x40e00b" in the End Address field. This record indicates that the instructions corresponding to an executed part identified by the function name "x_solve" are stored at addresses ranging from "0x409d20" to "0x40e00b" in the RAM 102. That is, the executed part "x_solve" is executed when any address in the range of the addresses is accessed.

FIG. 6 illustrates an example of an energy measurement table. The energy measurement table 112 is stored in the storage unit 110. The energy measurement table 112 has the following fields: Time, Instruction Address, and Cumulative Energy.

The Time field indicates a sampling time point at which an instruction address and cumulative energy were sampled. The Instruction Address field indicates the memory address of an instruction executed, which was obtained from the program counter. The Cumulative Energy field indicates cumulative energy obtained from the measurement device 200.

For example, the energy measurement table 112 has a record with "T1" in the Time field, "0x5156431" in the Instruction Address field, and "864654541" in the Cumulative Energy field. This record indicates that an instruction executed at the time point "T1" is stored at the memory address "0x5156431" and cumulative energy obtained from the measurement device 200 is "864654541". Time information, such as "T1", indicates how many seconds elapsed from a specified time point, for example. The verification apparatus 100 may convert such time information to year, month, day, hour, minute, and second.

The energy measurement table 112 indicates that the same cumulative energy "1982315963" is obtained at the time points "T2" and "T3". The reason that the same cumulative energy is sampled at two different time points is because the update intervals Ie for updating measurement data by the measurement device 200 are longer than the sampling intervals Ip used by the verification apparatus 100.

FIG. 7 illustrates an example of a corrected result table. The corrected result table 113 is stored in the storage unit 110. The corrected result table 113 has the following fields: Time, Instruction Address, and Cumulative Energy.

The Time field indicates a time point at which an instruction address and cumulative energy were sampled. The Instruction Address field contains an instruction address obtained from the program counter at the time point. The Cumulative Energy field indicates corrected cumulative energy for the time point.

For example, the corrected result table 113 has a record with "T3" in the Time field, "0x422427" in the Instruction Address field, and "1872085321" in the Cumulative Energy field. This record is obtained by correcting the cumulative energy of "1982315963" at the time point "T3" registered in the energy measurement table 112.

FIG. 8 illustrates an example of an energy analysis table. The energy analysis table 114 is stored in the storage unit 110, and has the following fields: Executed Part, Measurement Count, Energy Consumption, Maximum Energy Consumption, and Average Energy Consumption.

The Executed Part field indicates the name of an executed part. The Measurement Count field indicates how many times the executed part was sampled. The Energy Consumption field indicates cumulative energy consumed by the execution of the executed part. The Maximum Energy Consumption field indicates the maximum energy consumption (the maximum value among obtained energy consumption values). The Average Energy Consumption field indicates average energy consumption (an average value of obtained energy consumption values).

The maximum energy consumption may be considered as the maximum energy that is consumed for the executed part over the time period of the sampling intervals. The average energy consumption may be considered as the average energy that is consumed for the executed part over the time period of the sampling intervals. The cumulative energy may be considered as the cumulative amount of energy that is consumed for the executed part over the time period of the sampling intervals.

The energy analysis table 114 has a record with "x_solve" in the Executed Part field, "3291" in the Measurement Count field, "386855" in the Energy Consumption field, "134.9" in the Maximum Energy Consumption field, and "117.5" in the Average Energy Consumption field. This record indicates that the measurement regarding an executed part "x_solve" was performed 3291 times, the total energy consumption measured for the executed part is "386855", the maximum power consumption is "134.9", and the average energy consumption is "117.5".

The following exemplifies how the verification apparatus 100 verifies a verification target program. As described earlier, the verification apparatus 100 previously creates and stores the instruction address conversion table 111 in the storage unit 110 at the time of compiling the verification target program.

Figure 9:
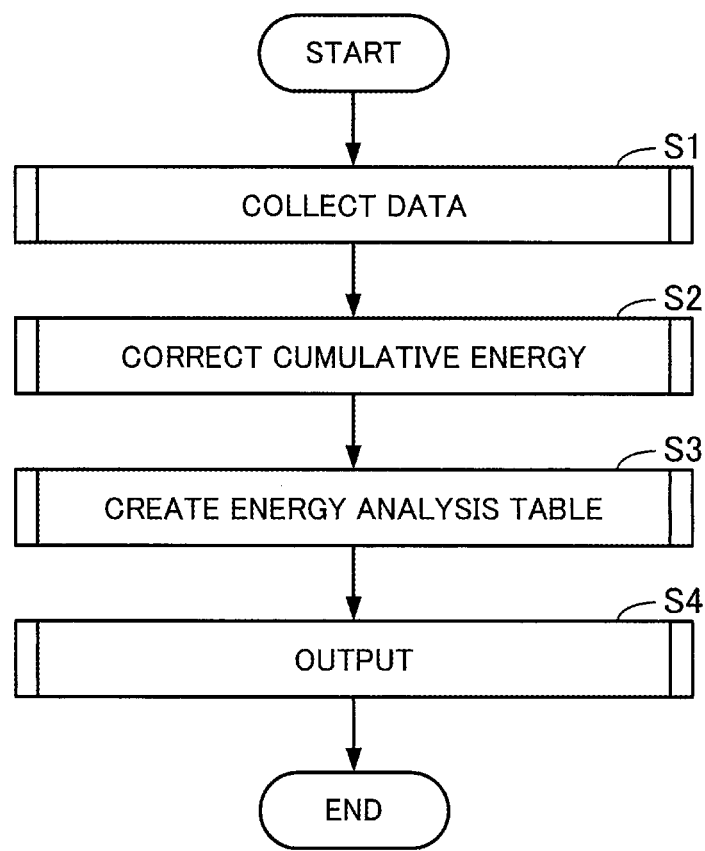
FIG. 9 is a flowchart illustrating an exemplary process performed by the verification apparatus.

FIG. 9 is a flowchart illustrating an exemplary process performed by the verification apparatus. The process of FIG. 9 will be described step by step.

(S1) The collecting unit 120 begins to run a verification target program, and also begins to sample an address and cumulative energy. The collecting unit 120 obtains the address of an instruction being executed, from the program counter of the processor 101. In addition, the collecting unit 120 sends a request for providing measurement data to the measurement device 200. The measurement device 200 sends the measurement data on cumulative energy to the verification apparatus 100 in response to the request. The collecting unit 120 receives the measurement data from the measurement device 200. The collecting unit 120 registers the obtained address and the received information about the cumulative energy in association with the sampling time point in the energy measurement table 112. This step will be described in detail later.

(S2) The correction unit 130 corrects the cumulative energy in the energy measurement table 112 created by the collecting unit 120, and creates the corrected result table 113. This step will be described in detail later.

(S3) The aggregation unit 140 creates the energy analysis table 114 on the basis of the corrected result table 113 created by the correction unit 130. This step will be described in detail later.

(S4) The display control unit 150 visualizes the energy consumption for each executed part of the verification target program (for example, makes a graph), on the basis of the energy analysis table 114 created by the aggregation unit 140, and displays the energy consumption on the display 13. This step will be described in detail later.

Figure 10:
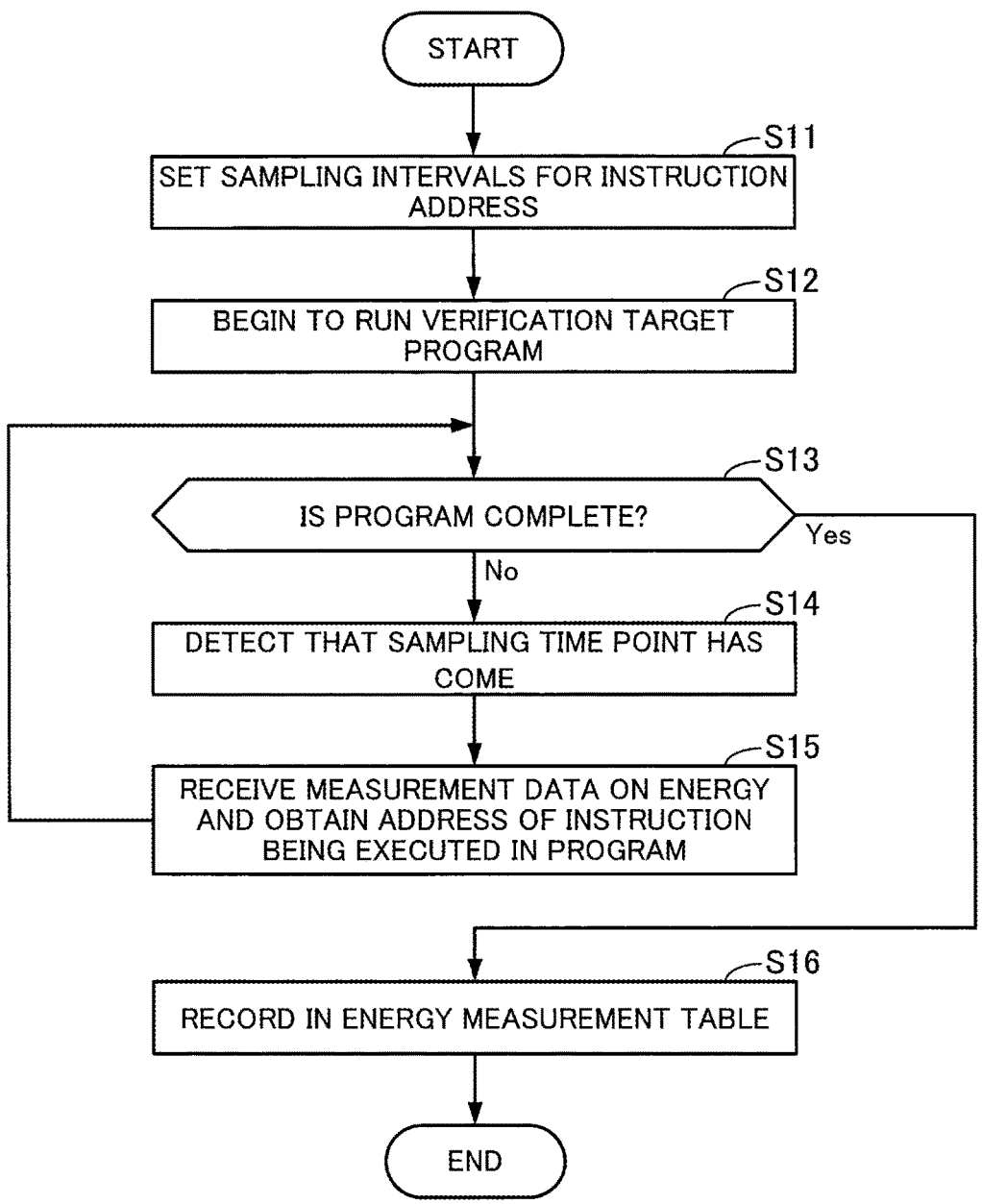
FIG. 10 is a flowchart illustrating an example of a data collection process.

FIG. 10 is a flowchart illustrating an example of a data collection process. The process of FIG. 10 will be described step by step. The following procedure corresponds to step S1 of FIG. 9.

(S11) The collection unit 120 sets the sampling intervals Ip for sampling an instruction address. For example, the collection unit 120 collects information by generating an interruption for obtaining cumulative energy at the sampling intervals Ip while the verification target program runs. In this connection, the sampling intervals Ip and the update intervals Ie (Ie>Ip and Ie≈Ip) for updating measurement data by the measurement device 200 are registered in the storage unit 110 in advance.

(S12) The collection unit 120 begins to run the verification target program.

(S13) The collection unit 120 determines whether the verification target program is complete or not. If it is complete, the process proceeds to step S16; otherwise, the process proceeds to step S14.

(S14) The collection unit 120 detects that a sampling time point has come (for example, detects this sampling time point from an interruption generated).

(S15) The collection unit 120 receives measurement data on cumulative energy from the measurement device 200. The collection unit 120 obtains the address of an instruction being executed in the verification target program, from the program counter, and stores them in association with the sampling time point in a buffer or the like of the RAM 102. Then, the process proceeds to step S13.

(S16) The collection unit 120 records the information about the cumulative energy and instruction addresses obtained at step S15, in association with the sampling time points in the energy measurement table 112.

Figure 11:
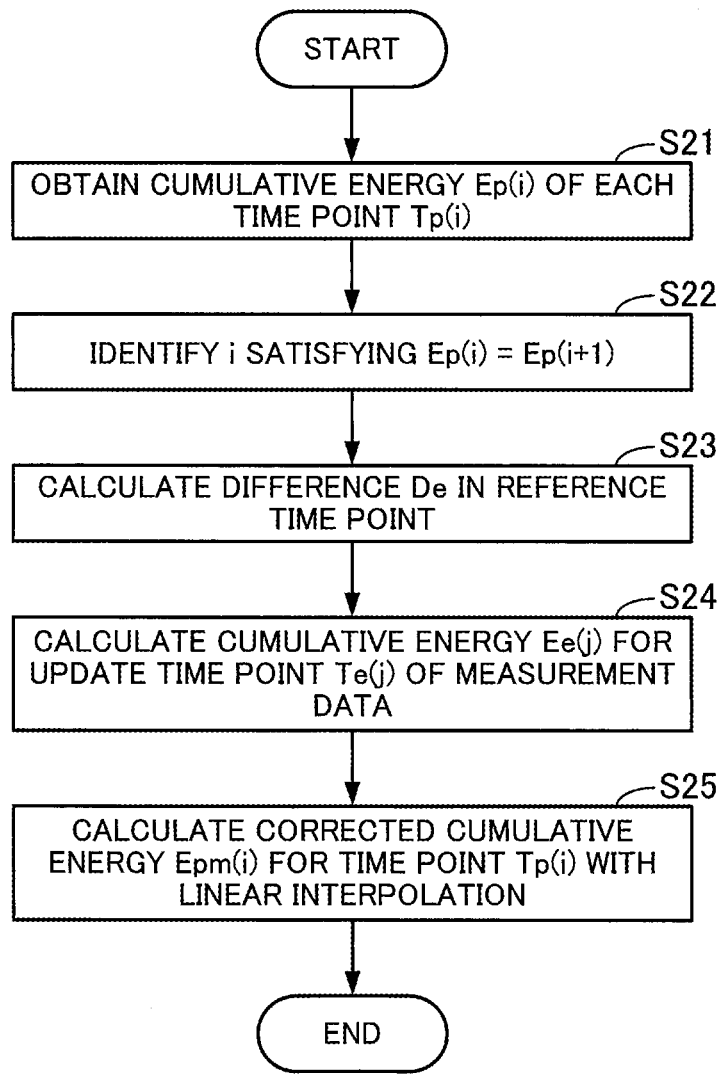
FIG. 11 is a flowchart illustrating an example of a cumulative energy correction process.

FIG. 11 is a flowchart illustrating an example of a cumulative energy correction process. The process of FIG. 11 will be described step by step. The following procedure corresponds to step S2 of FIG. 9.

(S21) The correction unit 130 obtains the cumulative energy Ep(i) of each time point Tp(i) from the energy measurement table 112 stored in the storage unit 110.

(S22) The correction unit 130 identifies all "i" values satisfying Ep(i)=Ep(i+1).

(S23) The correction unit 130 obtains, with respect to each of the identified "i" values, a plurality of combinations $(i_k, j_k)$ of i and j for determining the upper and lower limits of the difference De with the equation (8), and then calculates a difference De in the reference time point with the equation (9). The correction unit 130 obtains the update time point Te(j) of the measurement data updated by the measurement device 200 for each "j" value with the equations (2) and (3) using the difference De.

(S24) The correction unit 130 calculates the cumulative energy Ee(j) for the update time point Te(j). More specifically, the correction unit 130 takes the cumulative energy Ee(j) as Ee(j)=Ep(i) for Te(j) satisfying Tp(i−1)<Te(j)≤Tp(i).

(S25) The correction unit 130 calculates the corrected cumulative energy Epm(i) for the time point Tp(i) with linear interpolation using the calculated cumulative energy Ee(j).

Figure 12:
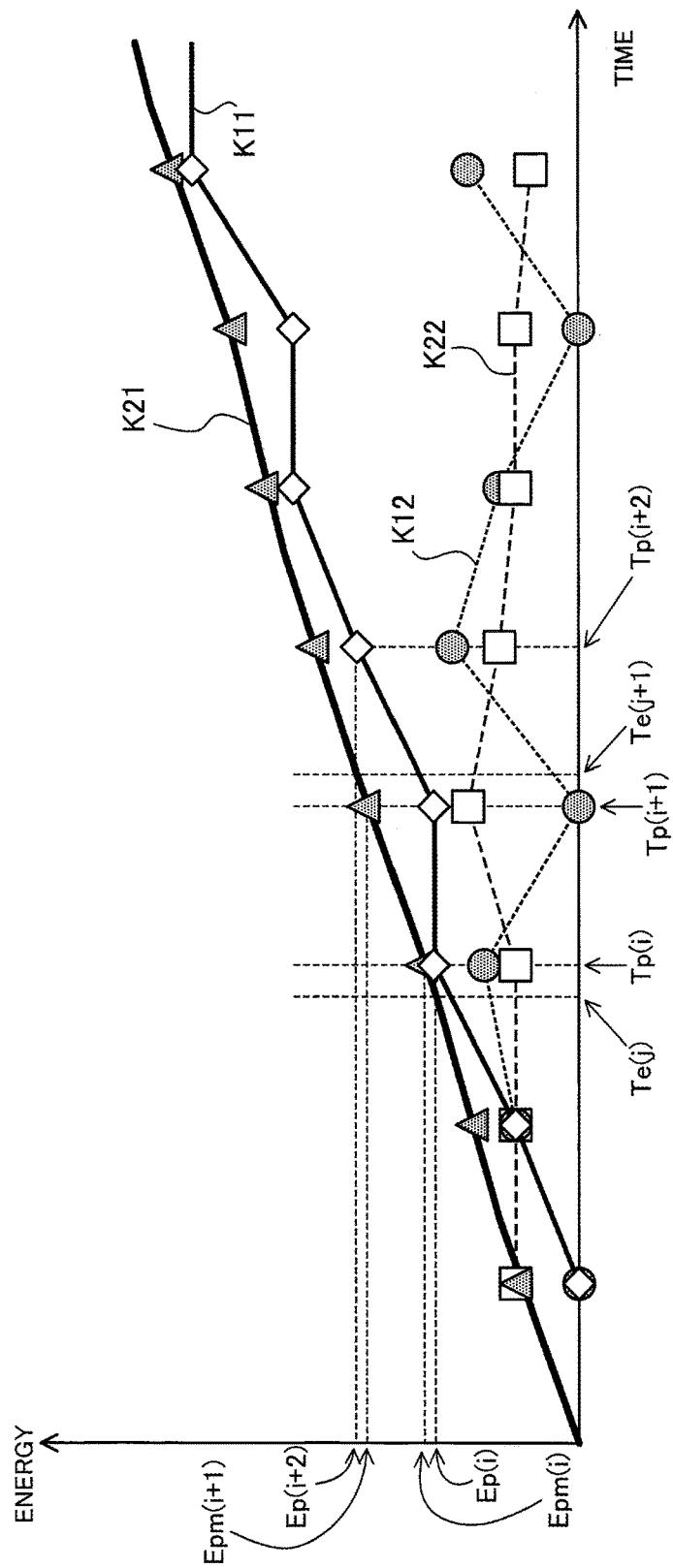
FIG. 12 illustrates a specific example of linear interpolation.

FIG. 12 illustrates a specific example of linear interpolation. FIG. 12 exemplifies four kinds of plot lines (lines K11, K12, K21, and K22) each representing a relationship between time and energy consumption. The horizontal axis represents time, and the vertical axis represents energy.

The line K11 represents originally obtained cumulative energy in time series. For example, the line K11 is generated from the energy measurement table 112. The line K12 represents a differential amount of energy (hereinafter, referred to as differential energy) P(i)=Ep(i)−Ep(i−1) between the cumulative energy Ep(i−1) at the time point Tp(i−1) and the cumulative energy Ep(i) at the time point Tp(i), in time series. The line K12 may be said to represent energy P(i) consumed over the time period from the time point Tp(i−1) to the time point Tp(i). In the case of Ep(i)=Ep(i+1), P(i)=0 is obtained, and therefore the energy consumption for the time period from the time point Tp(i) to the time point Tp(i+1) is observed to be zero by error.

To deal with this, the correction unit 130 obtains the line K21 by correcting the line K11. More specifically, the correction unit 130 calculates the difference De with the equation (9), and obtains the time point Te(j) for each "j" value. Then, taking the cumulative energy Ee(j) as Ee(j)=Ep(i) for Te(j) satisfying Tp(i−1)<Te(j)≤Tp(i), the correction unit 130 calculates the corrected cumulative energy Epm(i+1) for the time point Tp(i+1) with the following equation (10).

$$Epm(i+1) = \frac{Ee(j+1) - Ee(j)}{Te(j+1) - Te(j)} \times (Tp(i+1) - Te(j)) + Ee(j) \quad (10)$$

Similarly, the correction unit 130 calculates the corrected cumulative energy Epm(i) for the time point Tp(i) with the following equation (11).

$$Epm(i) = \frac{Ee(j+1) - Ee(j)}{Te(j+1) - Te(j)} \times (Tp(i) - Te(j)) + Ee(j) \quad (11)$$

In addition, for the time point Tp(i+2) satisfying Te(j+1) <Tp(i+2)≤Te(j+2), the correction unit 130 is able to calculate the corrected cumulative energy Epm(i+2) with the following equation (12).

$$Epm(i+2) = \qquad (12)$$
$$\frac{Ee(j+2) - Ee(j+1)}{Te(j+2) - Te(j+1)} \times (Tp(i+2) - Te(j+1)) + Ee(j+1)$$

The correction unit 130 registers the corrected cumulative energy of each time point Tp(i) in the corrected result table 113. The line K21 represents the corrected cumulative energy. For example, the line K21 is generated from the corrected result table 113. The line K22 represents differential energy Q(i)=Epm(i)−Epm(i−1) between the corrected cumulative energy Epm(i−1) at the time point Tp(i−1) and the corrected cumulative energy Epm(i) at the time point Tp(i). The line K22 may be said to represent differential energy Q(i) consumed over the time period from the time point Tp(i−1) to the time point Tp(i).

Comparing the lines K12 and K22 with each other, it is recognized that P(i+1)=0 but Q(i+1)≠0 at the time point Tp(i+1). This means that correct energy consumption for the time period from the time point Tp(i) to the time point Tp(i+1) is obtained.

As described above, the verification apparatus 100 corrects information about the cumulative energy obtained from the measurement device 200 with linear interpolation, so as to obtain cumulative energy for each time point correctly. The verification apparatus 100 also samples an instruction address accessed at each time point, so as to obtain energy consumption for each executed part corresponding to the sampled instruction addresses correctly.

Figure 13:
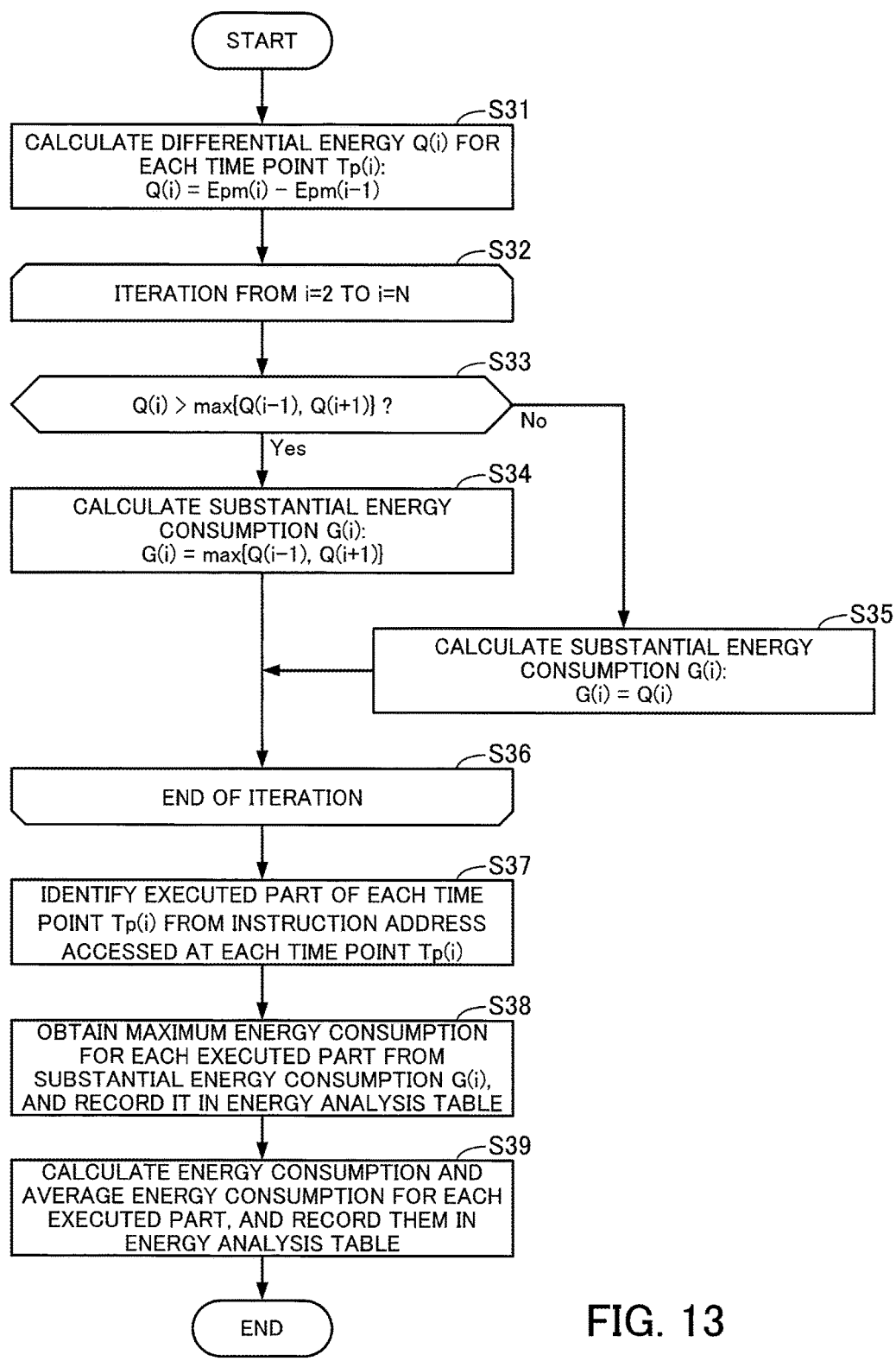
FIG. 13 is a flowchart illustrating an example of a calculation process of substantial maximum energy consumption.

FIG. 13 is a flowchart illustrating an example of a calculation process of substantial maximum energy consumption. The process of FIG. 13 will be described step by step. The following procedure corresponds to step S3 of FIG. 9.

(S31) The aggregation unit 140 calculates differential energy Q(i)=Epm(i)−Epm(i−1) with reference to the corrected result table 113.

(S32) The aggregation unit 140 iterates steps S33 to S35 for each executed part. The aggregation unit 140 iterates these steps while incrementing "i" from two to "N" one by one. "N" here indicates the final sampling.

(S33) The aggregation unit 140 determines whether Q(i) >max{Q(i−1), Q(i+1)} is satisfied. That is, the aggregation unit 140 determines whether Q(i) is higher than Q(i−1) or Q(i+1), whichever is higher. If Q(i) is higher, the process proceeds to step S34. If Q(i) is not higher (that is, Q(i) is smaller than or equal to Q(i−1) or Q(i+1), whichever is higher), the process proceeds to step S35.

(S34) The aggregation unit 140 takes the substantial energy consumption G(i) for the time point Tp(i) as G(i) =max{Q(i−1), Q(i+1)}. That is to say, the aggregation unit 140 sets the substantial energy consumption G(i) of the time point Tp(i) to Q(i−1) or Q(i+1), whichever is higher. Then, the process proceeds to step S36.

(S35) The aggregation unit 140 takes the substantial energy consumption G(i) for the time point Tp(i) as G(i)=Q (i). At this time, the aggregation unit 140 registers the substantial energy consumption G(i) obtained up to step S35 in association with the time point Tp(i) in the RAM 102.

(S36) The aggregation unit 140 iterates steps S33 to S35 until "i" reaches "N". Then, this iteration of steps is completed.

(S37) The aggregation unit 140 identifies the executed part of each time point Tp(i) on the basis of the instruction address accessed at the time point Tp(i) with reference to the instruction address conversion table 111 and corrected result table 113. For example, if an instruction at an address belonging to a range of addresses corresponding to an executed part "x_solve" is executed at a certain time point, the aggregation unit 140 identifies "x_solve" as the executed part executed at the time point.

(S38) The aggregation unit 140 obtains the maximum energy consumption (substantial maximum energy consumption) for each executed part, on the basis of the substantial energy consumption G(i) of each time point Tp(i) obtained at steps S32 to S36. The aggregation unit 140 then records the obtained maximum energy consumption in association with the corresponding executed part in the energy analysis table 114.

(S39) The aggregation unit 140 calculates total energy consumption for each executed part with reference to the instruction address conversion table 111 and corrected result table 113, and records the total energy consumption in the Energy Consumption field of the energy analysis table 114. The aggregation unit 140 calculates the average energy consumption for each executed part with reference to the instruction address conversion table 111 and corrected result table 113, and records the average energy consumption in the Average Energy Consumption field of the energy analysis table 114. An executed part of the verification target program is identified from an instruction address recorded in the corrected result table 113 in the same way as exemplified at step s37.

In this connection, steps S32 to S36 may be executed only for a predetermined number of pieces of data (for example, Q(t−W), Q(t−W+1), . . . , Q(t), Q(t+W)) including the maximum value Q(t) of the differential energy Q(i). The execution of these steps only for data around the maximum value Q(t) reduces the number of iterations and thus reduces operation cost.

Figure 14:
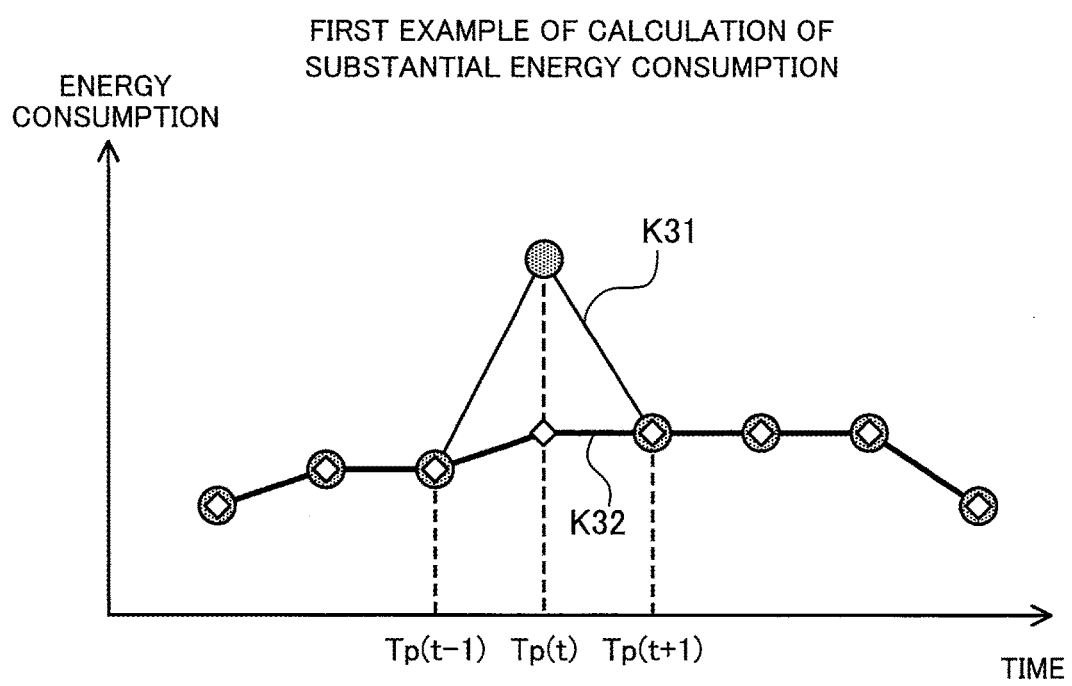
FIG. 14 illustrates a first example of the calculation of substantial energy consumption.

FIG. 14 illustrates a first example of the calculation of substantial energy consumption. FIG. 14 exemplifies two kinds of plot lines (lines K31 and K32) each representing a relationship between time and energy consumption. The horizontal axis represents time, and the vertical axis represents energy consumption. The line K31 is obtained by plotting differential energy Q(i) at the time point Tp(i). In this connection, the lines K31 and K32 in FIG. 14 overlap, except for the time point Tp(t).

The line K31 has the maximum differential energy Q(t) at the time point Tp(t). In this example of the line K31, max{Q(T−1), Q(t+1)}=Q(t+1) and Q(t)>Q(t+1) are satisfied. This means that Q(t)>max{Q(t−1), Q(t+1)} is satisfied. Therefore, the aggregation unit 140 takes the substantial energy consumption G(t) as G(t)=Q(t+1). With respect to the line K31, the aggregation unit 140 replaces the value of the time point Tp(t) with the substantial energy consumption G(t). At the other time points in FIG. 14, the substantial energy consumption G(i)=Q(i). Thereby, the aggregation unit 140 obtains the corrected line K32. The aggregation unit 140 obtains the maximum energy consumption for each executed part on the basis of the line K32.

Obtaining substantial energy consumption in this way makes it possible to obtain the correct maximum energy consumption. The reasons are as follows. The maximum energy consumption may be obtained in order to confirm the maximum energy used by a verification target program. At this time, it is preferable that an instantaneous value, such as the maximum energy consumption, be corrected when data on obtained cumulative energy is presented to a user as an energy profile of the verification target program. The happening that the energy consumption increases to the maximum instantaneously and then decrease soon after may be considered to be due to an effect of charge stored in a capacitor in an electronic circuit of the verification apparatus 100 or in an uninterruptible power supply device connected to the verification apparatus 100 or an impact of a feedback delay of automatic power control for the operational frequency or another of the processor 101. That is to say, in the case where the energy consumption increases to the maximum instantaneously, an effect of a capacitor or the impact of a feedback delay of automatic power control likely needs to be considered. In this case, it is desirable that the substantial maximum energy consumption be obtained with such an effect and impact eliminated.

To this end, the aggregation unit 140 eliminates effects of capacitors and feedback of automatic power control as described above, in order to obtain substantial energy consumption $G(i)$ for the time point $Tp(i)$ correctly. Especially, the method exemplified in FIGS. 13 and 14 is useful for the case where relatively small charge is stored in a capacitor or the case where the feedback of automatic power control is performed relatively fast by the processor 101. Then, the aggregation unit 140 obtains the maximum value of the substantial energy consumption $G(i)$, thereby obtaining the substantial maximum energy consumption correctly.

Figure 15:
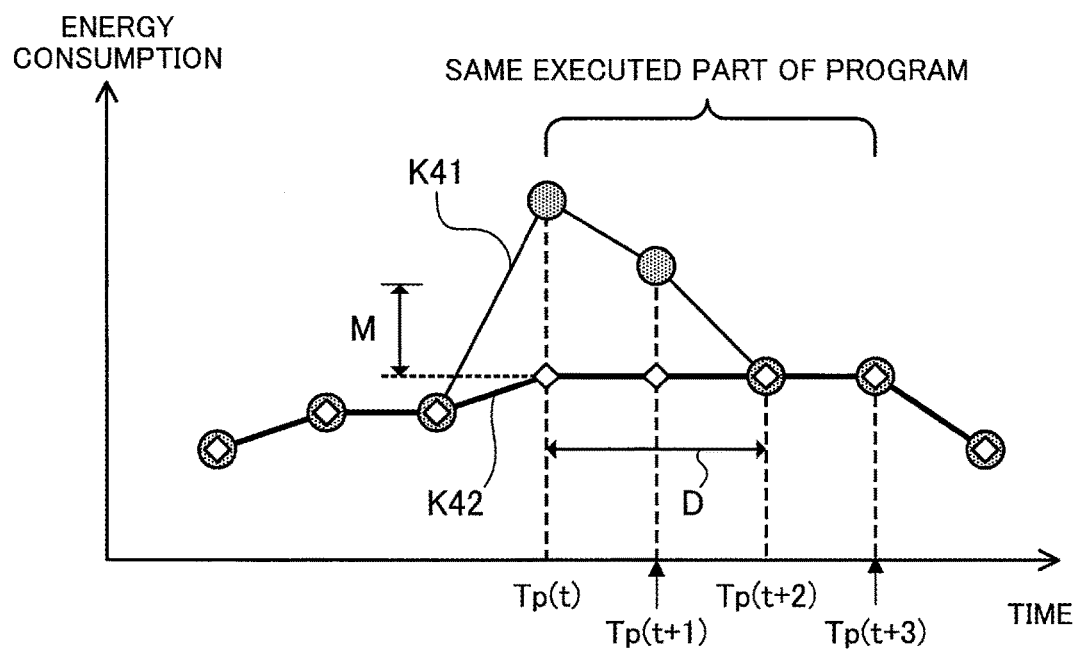
FIG. 15 illustrates a second example of the calculation of substantial energy consumption.

FIG. 15 illustrates a second example of the calculation of substantial energy consumption. For example, in the case where the feedback of automatic power control is relatively slow, the aggregation unit 140 may calculate substantial energy consumption $G(i)$ and obtain the substantial maximum energy consumption as follows. In the following, "D" is a constant parameter (an integer of one or greater) that denotes a feedback delay, and "M" is a constant parameter (representing an amount of energy that is able to be stored) based on the capacity of a capacitor.

(1) The aggregation unit 140 takes substantial energy consumption $G(i)$ as $G(i)=Q(i)$ in the case where the same executed part of a verification target program is executed at the time points $Tp(i)$, $Tp(i+1)$, . . . , $Tp(i+D)$ and the differential energy $Q(i)$ satisfies $Q(i) \leq \min\{Q(i+1), \ldots, Q(i+D)\}+M$.

(2) The aggregation unit 140 takes substantial energy consumption $G(i)$ as $G(i)=\max\{Q(i+m)\}$ in the case where the same executed part of the verification target program is executed at the time points $Tp(i)$, $Tp(i+1)$, . . . , $Tp(i+D)$ and the differential energy $Q(i)$ satisfies $Q(i) > \min\{Q(i+1), \ldots, Q(i+D)\}+M$. Assume that "m" is an integer satisfying $1 \leq m \leq D$ and $Q(i+m) < Q(i)-M$ (this condition for "m" is referred to as condition L). The max operation is to obtain the maximum value from a plurality of $Q(i+m)$ values.

(3) In the case where either of the above (1) and (2) is not applicable, the aggregation unit 140 takes substantial energy consumption $G(i)$ as $G(i)=$differential energy $Q(i)$.

Thus obtained maximum value of the substantial energy consumption $G(i)$ may be taken as the substantial maximum energy consumption.

FIG. 15 exemplifies two kinds of plot lines (lines K41 and K42) each representing a relationship between time and energy consumption. The horizontal axis represents time, and the vertical axis represents energy consumption (an amount of energy consumed over the time period of sampling intervals). The line K41 is obtained by plotting the differential energy $Q(i)$ at the time point $Tp(i)$. In this connection, the lines K41 and K42 in FIG. 15 overlap, except for the time points $Tp(t)$ and $Tp(t+1)$.

The line K41 has the maximum differential energy $Q(t)$ at the time point $Tp(t)$. Assume that $D=2$. In the example of FIG. 15, the same executed part of the verification target program is executed at the time points $Tp(t)$, $Tp(t+1)$, $Tp(t+2)$, and $Tp(t+3)$, and different executed parts are executed at the other time points.

Assume now that $\min\{Q(t+1), Q(t+2)\}=Q(t+2)$ and $Q(t) > Q(t+2)+M$ are satisfied. That is, $Q(t) > \min\{Q(t+1), Q(t+2)\}+M$ holds.

Since $Q(t+1) > Q(t)-M$, $m=1$ does not satisfy the condition L. Since $Q(t+2) < Q(t)-M$, $m=2$ satisfies the condition L. Therefore, $m=2$ satisfies the condition L for $Q(t)$. In addition, $\max\{Q(t+2)\}=Q(t+2)$. Therefore, the aggregation unit 140 takes the substantial energy consumption $G(t)$ as $G(t)=\max\{Q(t+2)\}=Q(t+2)$.

The aggregation unit 140 is able to obtain the substantial energy consumption $G(t+1)$ for the time point $Tp(t+1)$ in the same manner. More specifically, assume that $\min\{Q(t+2), Q(t+3)\}=Q(t+2)$ and $Q(t+1) > Q(t+2)+M$ are satisfied. That is, $Q(t+1) > \min\{Q(t+2), Q(t+3)\}+M$ holds.

At this time, since $Q(t+2) < Q(t+1)-M$, $m=1$ satisfies the condition L. In addition, since $Q(t+3) < Q(t+1)-M$, $m=2$ satisfies the condition L. Therefore, $m=1, 2$ satisfies the condition L for $Q(t+1)$. In addition, $\max\{Q(t+2), Q(t+3)\}=Q(t+3)$. Therefore, the aggregation unit 140 takes the substantial energy consumption $G(t+1)$ as $G(t+1)=\max\{Q(t+2), Q(t+3)\}=Q(t+3)$.

At the other time points in FIG. 15, the substantial energy consumption $G(i)$ is taken as $G(i)=Q(i)$. As a result, the aggregation unit 140 obtains the corrected line K42. The aggregation unit 140 obtains the maximum energy consumption for each executed part on the basis of the line K42. In this way, the aggregation unit 140 is able to eliminate effects of automatic power control and capacitors to obtain the substantial maximum energy consumption correctly even if the feedback of the automatic power control is relatively slow.

In this connection, the aggregation unit 140 uses the substantial energy consumption $G(i)$ only to calculate the substantial maximum energy consumption, not to calculate the energy consumption or average energy consumption for each executed part of the verification target program. Therefore, the correction made to obtain the substantial energy consumption $G(i)$ does not have an effect on the comparison of the energy consumption and the average energy consumption for each executed part.

Figure 16:
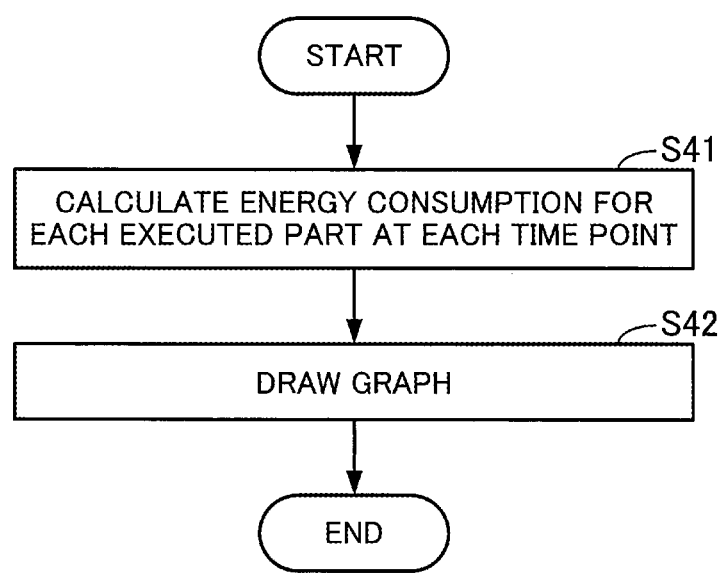
FIG. 16 is a flowchart illustrating an example of an output process.

FIG. 16 is a flowchart illustrating an example of an output process. In the following, the process of FIG. 16 will be described step by step.

(S41) The display control unit 150 calculates energy consumption $R(i)$ for each executed part at each time point $Tp(i)$ with reference to the instruction address conversion table 111 and corrected result table 113 stored in the storage unit 110. More specifically, the display control unit 150 takes the energy consumption $R(i)$ as $R(i)=Epm(i)-Epm(i-1)$. In this connection, at step S31 of FIG. 13, the aggregation unit 140 may store the result of calculating the energy consumption $R(i)$ ($=Q(i)$) for each executed part at each time point $Tp(i)$ in the storage unit 110.

(S42) The display control unit 150 draws a three-dimensional line graph in which the first axis represents time, the second axis represents energy consumption, and the third axis represents the executed parts of the verification target program, on the basis of the calculation results of step S41, on the display 13. The display control unit 150 may modify the three-dimensional line graph so as to change its viewpoint in response to user inputs. The display control unit 150 sorts the executed parts on the third axis with reference to the energy analysis table 114 stored in the storage unit 110. For example, the display control unit 150 sorts the executed parts according to a descending order of the number of times of sampling, a descending order of total energy consumption, a descending order of maximum energy consumption, a descending order of average energy consumption, or another order, in response to a user instruction.

Figure 17:
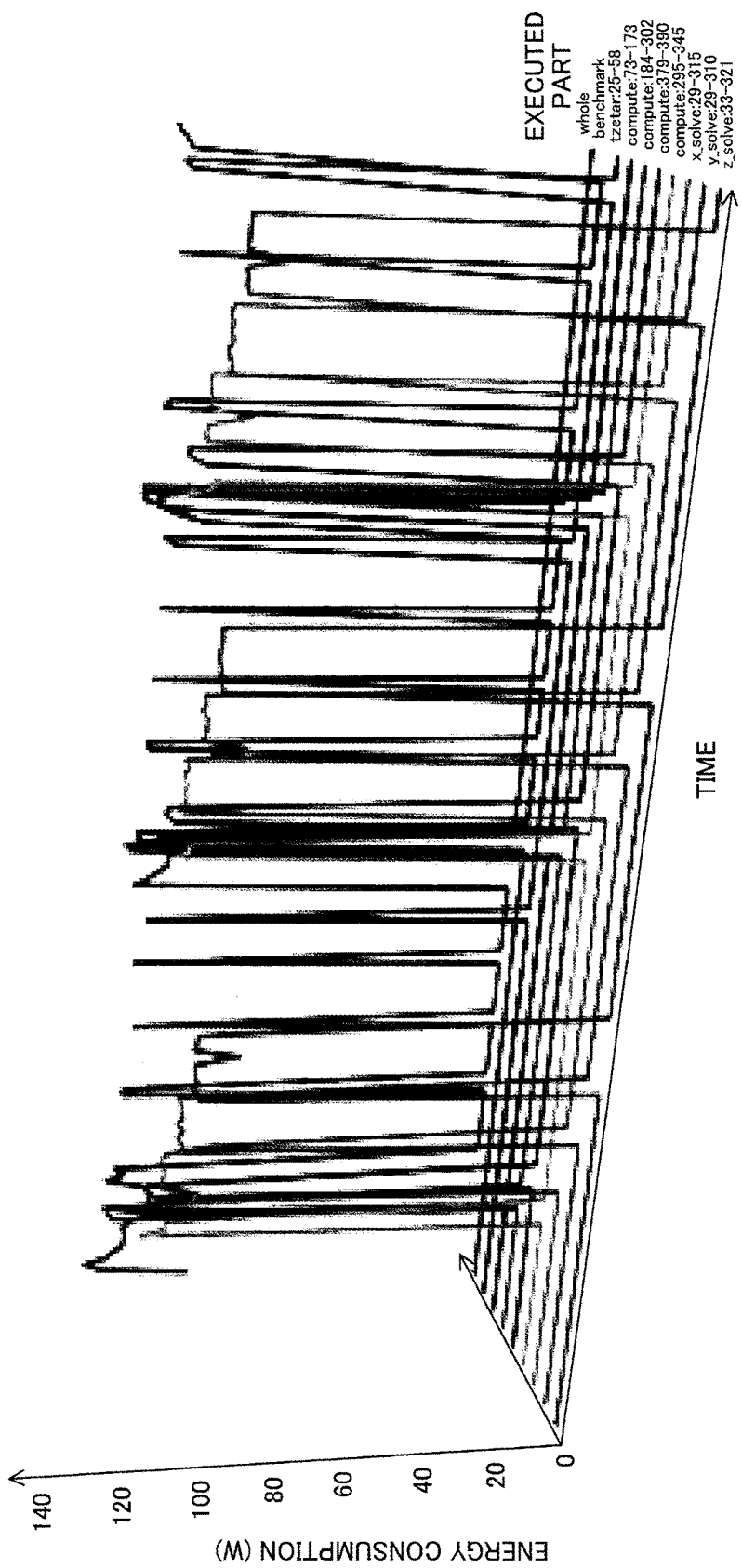
FIG. 17 illustrates a first display example of a graph.

FIG. 17 illustrates a first display example of a graph. The display control unit 150 visualizes the energy consumed during the execution of a verification target program, with a three-dimensional graph as illustrated in FIG. 17. In this three-dimensional graph, for example, the first axis (horizontal direction) represents time, the second axis (vertical direction) represents energy consumption (for example, average energy consumption), and the third axis (depth direction) represents executed parts of the program.

With respect to the executed parts on the third axis, a desired granularity level, such as subroutines, loops, or row numbers of the source program, may be selected according to the situation of verification. For example, a plurality of instruction address conversion tables 111 may be prepared for respective granularity levels, so as to recognize energy consumption for executed parts based on the plurality of granularity levels. Data on energy consumption obtained while a program runs is grouped based on any granularity level. The display control unit 150 draws a three-dimensional graph, taking data corresponding to the same subroutine, the same loop, or the same row numbers as a single line.

The arrangement order on the third axis is important. For example, the display control unit 150 sorts data according to (a) a descending order of execution frequency (that is, the number of times of sampling), (b) a descending order of total energy consumption, (c) a descending order of maximum energy consumption, (d) a descending order of average energy consumption, or another order.

A graph according to the descending order of execution frequency supports a user to determine which executed parts to modify so as to improve energy saving while suppressing an increase in the execution time of the program. For example, for preventing a long execution time, the user is able to determine that it is effective to reduce energy consumption of executed parts, except for higher-ranked (for example, first- and second-ranked) executed parts in terms of execution frequency.

A graph according to the descending order of total energy consumption supports the user to determine which executed parts to modify so as to reduce total energy consumption. For example, the user is able to determine that it is effective to reduce the energy consumption of executed parts in order starting from the highest-ranked executed part.

By the way, the maximum value of energy consumption may limit a time during which a program is executable, depending on the operational conditions of a computer to be used (for example, such a time for execution may be limited to a night time). Therefore, it may be required that the maximum value of energy consumption be lower than or equal to a predetermined value. For this case, a graph according to the descending order of maximum energy consumption supports the user to determine which parts to modify so as not to limit the time to execute the program. For example, the user is able to determine that it is effective to reduce the maximum energy consumption of executed parts in order starting from the highest-ranked executed part in terms of maximum energy consumption.

A graph according to the descending order of average energy consumption supports the user to identify parts whose energy consumption may be reduced while an increase in their execution times are suppressed and parts which may be executed faster by temporarily using additional hardware resources.

Figure 18:
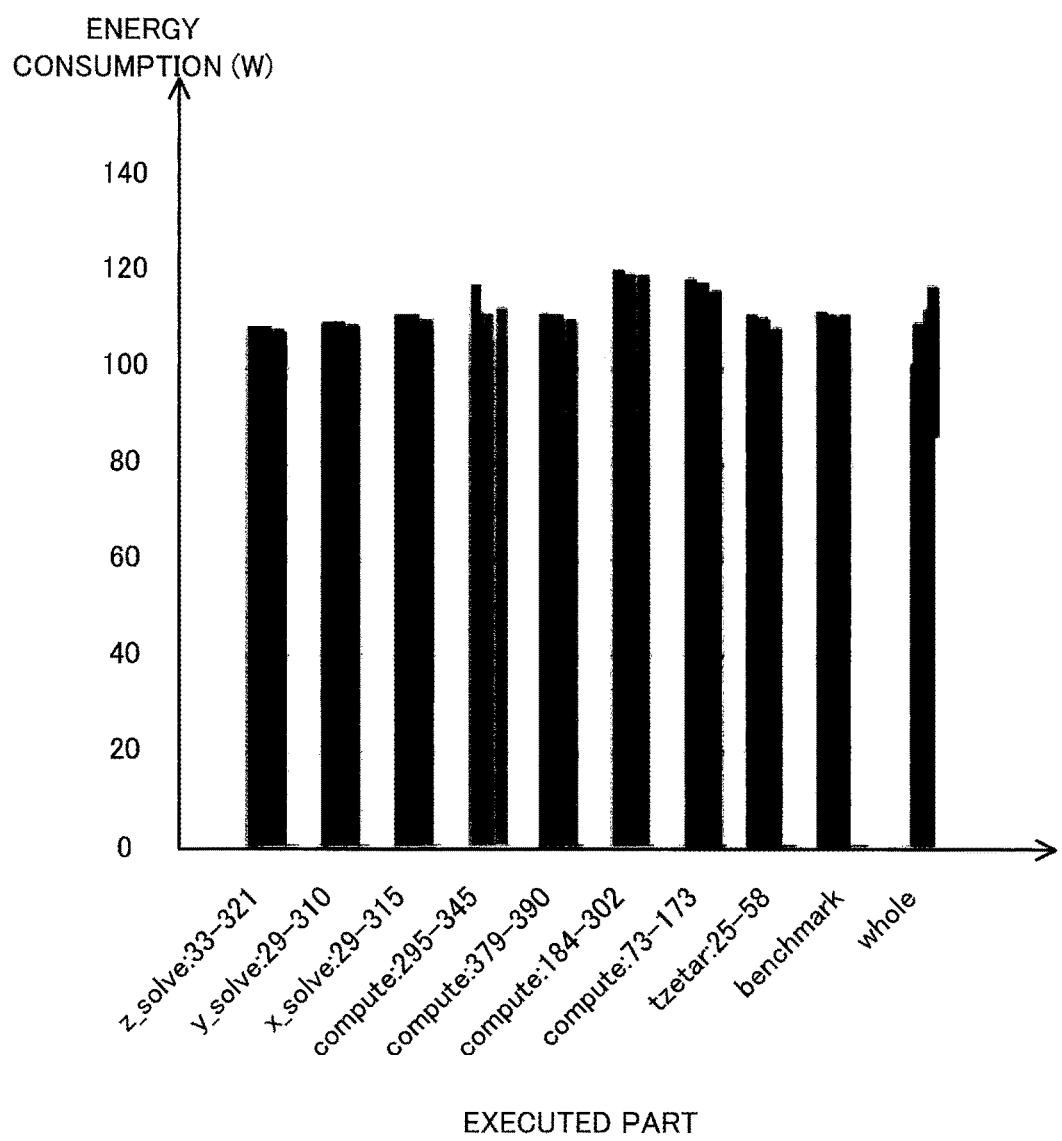
FIG. 18 illustrates a second display example of a graph.

FIG. 18 illustrates a second display example of a graph. The display control unit 150 is able to draw a two-dimensional graph of verification results. FIG. 18 illustrates a graph in which the horizontal axis represents executed parts and the vertical axis represents energy consumption (for example, average energy consumption). As described earlier, the display control unit 150 is able to sort the executed parts on the horizontal axis according to a desired order based on execution frequency, total energy consumption, maximum energy consumption, average energy consumption, or another, with reference to the energy analysis table 114. The display control unit 150 may draw a user-friendly graph in response to a user instruction, thereby supporting user's effective consideration of parts to be modified.

Especially, the verification apparatus 100 of the second embodiment is able to correctly obtain energy consumption for each executed part by correcting sampled cumulative energy with linear interpolation. Therefore, it is able to present the correct energy consumption for each executed part to the user. That is to say, the verification apparatus 100 is able to support the user to consider appropriate parts to be modified in a program. By viewing the results of obtaining the energy consumption of the verification apparatus 100, the user is able to determine which parts needs to be modified in a program more correctly.

The information processing of the first embodiment may be implemented by the computation unit 1b executing a program. The information processing of the second embodiment may be implemented by the processor 101 executing a program. Such a program may be recorded on the computer-readable recording medium 15.

For example, the program may be recorded on recording media 15 that are then distributed. Alternatively, the program may be stored in another computer and may be distributed through a network. A computer may store (install) the program recorded on a recording medium 15 or the program received from the other computer to its storage device, such as the RAM 102 or HDD 103, read the program from the storage device, and then run the program.

According to one aspect, it is possible to obtain energy consumption correctly for each executed part of a program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a memory that stores therein first information indicating a correspondence between each executed part of a program and a range of memory addresses of instructions of said each executed part of the program; and
a processor that performs a process including:
acquiring, at sampling intervals, second information indicating a correspondence among each acquisition time point at which a result of measuring cumulative energy consumed during an execution of the program was acquired, the cumulative energy, and a memory address of an instruction executed at said each acquisition time point, the result of measuring cumulative enemy consumed being updated by a measurement device which measures cumulative enemy consumed of the information processing apparatus at update intervals while the acquiring, the update intervals being longer than the sampling intervals;
determining time points in an execution of a predetermined executed part of the program, based on the first information and the second information;
calculating cumulative energy for each update time point at which the result of the measuring by the measurement device is updated, based on the second information, the update intervals, and the sampling intervals;
correcting cumulative energy for said each acquisition time point by performing linear interpolation using the calculated cumulative energy of said each update time point;
calculating enemy consumption of the predetermined executed part for said each acquisition time point, based on a result of the correcting, and
obtaining maximum enemy consumption for said each executed part, based on the calculated enemy consumption of said each acquisition time point.

2. The information processing apparatus according to claim 1, wherein the calculating includes calculating cumulative energy for an acquisition time point between a first update time point and a second update time point next to the first update time point in the execution of the predetermined executed part, with the linear interpolation using first cumulative energy of the first update time point and second cumulative energy of the second update time point.

3. The information processing apparatus according to claim 2, wherein the calculating includes:
dividing a difference between the first cumulative energy and the second cumulative energy by a difference between the first update time point and the second update time point;
multiplying a first result of the dividing by a difference between the first update time point and the acquisition time point;
summing a second result of the multiplying and the first cumulative energy; and
taking a result of the summing as the cumulative energy for the acquisition time point.

4. The information processing apparatus according to claim 1, wherein the calculating the energy consumption includes correcting the energy consumption of a first time point based on a comparison with the energy consumption of a second time point.

5. The information processing apparatus according to claim 4, wherein the correcting the energy consumption includes correcting the energy consumption of the first time point to energy consumption of a time point previous to the first time point or energy consumption of a time point next to the first time point, whichever is higher, when the energy consumption of the first time point is higher than the energy consumption of the previous time point and the energy consumption of the next time point.

6. The information processing apparatus according to claim 4, wherein the correcting the energy consumption includes correcting the energy consumption based on a comparison among the energy consumption of the first time point and energy consumption of a plurality of time points after a time point next to the first time point.

7. The information processing apparatus according to claim 1, wherein the process further includes
calculating energy consumption of the predetermined executed part for said each acquisition time point, based on a result of calculating the cumulative energy for said each acquisition time point, and
outputting information on a three-dimensional graph representing a correspondence among said each acquisition time point, the energy consumption, and the predetermined executed part.

8. A non-transitory computer-readable storage medium storing a computer program that causes a computer to perform a process for measuring energy consumption, the process comprising:
acquiring, at sampling intervals, first information indicating a correspondence among each acquisition time point at which a result of measuring cumulative energy consumed during an execution of a program by an information processing device was acquired, the cumulative energy, and a memory address of an instruction executed at said each acquisition time point, the result of measuring cumulative enemy consumed being updated by a measurement device which measures cumulative enemy consumed of the information processing apparatus at update intervals while the acquiring, the update intervals being longer than the sampling intervals;
determining time points in an execution of a predetermined executed part of the program, based on the first information and second information which indicates a correspondence between each executed part of the program and a range of memory addresses of instructions of the program; and
calculating cumulative enemy for each update time point at which the result of the measuring by the measurement device is updated, based on the second information, the update intervals, and the sampling intervals;
correcting cumulative energy for said each acquisition time point by performing linear interpolation using the calculated cumulative energy of said each update time point;
calculating enemy consumption of the predetermined executed part for said each acquisition time point, based on a result of the correcting, and
obtaining maximum enemy consumption for said each executed part, based on the calculated energy consumption of said each acquisition time point.

9. A method of measuring energy consumption, the method comprising:
acquiring, at sampling intervals by a computer, first information indicating a correspondence among each acquisition time point at which a result of measuring cumulative energy consumed during an execution of a program by the computer was acquired, the cumulative energy, and a memory address of an instruction executed at said each acquisition time point, the result of measuring cumulative energy consumed being updated by a measurement device which measures cumulative energy consumed of the computer at update intervals while the acquiring, the update intervals being longer than the sampling intervals;

determining, by the computer, time points in an execution of a predetermined executed part of the program, based on the first information and second information which indicates a correspondence between each executed part of the program and a range of memory addresses of instructions of the program; and calculating, by the computer, cumulative enemy for each update time point at which the result of the measuring by the measurement device is updated, based on the second information, the update intervals, and the sampling intervals;

correcting, by the computer, cumulative energy for said each acquisition time point by performing linear interpolation using the calculated cumulative energy of said each update time point;

calculating, by the computer, energy consumption of the predetermined executed part for said each acquisition time point, based on a result of the correcting, and obtaining, by the computer, maximum energy consumption for said each executed part, based on the calculated energy consumption of said each acquisition time point.

* * * * *